(12) United States Patent
Miura et al.

(10) Patent No.: US 7,083,707 B2
(45) Date of Patent: Aug. 1, 2006

(54) DECOMPOSITION APPARATUS AND DECOMPOSITION METHOD

(75) Inventors: Toshihiko Miura, Kiyose (JP); Hiroshi Kubo, Tokorozawa (JP); Kinya Kato, Kanagawa (JP); Masahiro Kawaguchi, Kanagawa (JP); Akira Kuriyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 393 days.

(21) Appl. No.: 10/206,622

(22) Filed: Jul. 26, 2002

(65) Prior Publication Data

US 2003/0019742 A1    Jan. 30, 2003

(30) Foreign Application Priority Data

Jul. 27, 2001    (JP) .............................. 2001-227673

(51) Int. Cl.
*C02F 1/461* (2006.01)

(52) U.S. Cl. ................................ 204/228.6; 204/275.1; 204/285.1

(58) Field of Classification Search ................ 205/688, 205/742; 204/228.6, 275.1, 278.5, 285.1; 588/204, 303
See application file for complete search history.

(56) References Cited

U.S. PATENT DOCUMENTS

| 5,126,020 | A | * | 6/1992 | Dames ........................ 588/306 |
| 5,362,367 | A | * | 11/1994 | Dapperheld et al. ......... 205/440 |
| 5,569,809 | A | * | 10/1996 | Gui ............................. 205/688 |
| 5,980,727 | A | * | 11/1999 | Putz et al. ................... 205/688 |
| 6,383,362 | B1 | * | 5/2002 | Satoh .......................... 205/688 |
| 6,444,015 | B1 |  | 9/2002 | Kato ............................ 95/143 |
| 6,462,250 | B1 |  | 10/2002 | Kuriyama et al. .......... 588/204 |
| 6,585,897 | B1 |  | 7/2003 | Kato ........................... 210/756 |
| 2003/0019743 | A1 |  | 1/2003 | Miura et al. .............. 204/275.1 |

FOREIGN PATENT DOCUMENTS

| EP | 1 062 989 A2 | 12/2000 |
| JP | 2001-240560 | 9/2001 |
| KR | 10-0415216 | 1/2004 |

* cited by examiner

*Primary Examiner*—Arun S. Phasge
(74) *Attorney, Agent, or Firm*—Fitzpatrick, Cella, Harper & Scinto

(57) ABSTRACT

A decomposition apparatus for decomposition of decomposition targets such as organic chlorinated compounds is provided. The decomposition apparatus includes a contact section with an internal space to allow a decomposition target to come into contact with and be taken into a liquid, a flow path to lead along with the liquid the decomposition target taken into the liquid to a position different from the internal space, a decomposing device positioned along the flow path in a state cut off from the outside air to decompose the decomposition target that has been led through the flow path, and a device to introduce to the contact section a liquid that contains products produced from the decomposition of the decomposition target by the decomposing device. The decomposing apparatus have plate-shaped electrodes that come into contact with and electrolyze the decomposition target that flows through the flow path, and wherein the surfaces of the electrodes are positioned within the decomposing device at an angle different from the flow direction of the liquid in the flow path, for example, perpendicular to the flow direction of the liquid in the flow path.

6 Claims, 3 Drawing Sheets

DECOMPOSITION APPARATUS AND DECOMPOSITION METHOD

BACKGROUND OF THE INVENTION

1. Field of the Invention

The present invention relates to a decomposition apparatus and a decomposition method suitable for the decomposition of decomposition targets such as organic chlorinated compounds.

2. Related Background Art

Organic chlorinated compounds used to clean machinery are often found to be contaminating the soil of vacant lots where factories or dry cleaning establishments used to stand. Such organic chlorinated compounds are chemically stable, and this has drawn attention to cleaning the contaminated soil in recent years.

Some of the methods for decomposing/removing organic chlorinated compounds include incineration, thermal decomposition, photolysis, oxidative decomposition, reductive decomposition, using catalysts, and microbial decomposition. Besides these, electrolysis has been developed as a decomposition/removal method. The electrolysis method is a technology in which contaminated water containing organic chlorinated compounds is energized to alter electrode surfaces to an oxidative or reductive state, which decomposes the contaminants through oxidation-reduction reaction and makes them harmless.

However, in such a conventional electrolysis method, electrodes cannot be inserted into organic chlorinated compounds in a gaseous or mist state extracted from contaminated soil to be energized. There is a method to absorb organic chlorinated compounds in a gaseous or mist state into a liquid phase and energize the liquid phase to electrolytically process it, but this requires a separate processing for the liquid phase after the organic chlorinated compounds are absorbed.

It is known that as the concentration of contaminants increases, so does the electric decomposition efficiency per unit electrical charge. However, when the liquid phase that has absorbed an organic chlorinated compound is electrolyzed, the concentration falls as the decomposition process continues, so that the decomposition efficiency per unit time declines.

SUMMARY OF THE INVENTION

The present invention solves the above problem and provides a decomposition apparatus and a decomposition method for hazardous materials, as well as a decomposition apparatus and a decomposition method for substances, that do not require a separate processing of a liquid phase that has absorbed hazardous materials such as organic chlorinated compounds, and that can maintain high decomposition efficiency.

A decomposition apparatus in accordance with an embodiment of the present invention comprises a contact section with an internal space to allow a decomposition target to come into contact with and be taken into a liquid, a flow path to lead along with the liquid the decomposition target taken into the liquid to a position different from the internal space, a decomposing device positioned along the flow path in a state cut off from the outside air to decompose the decomposition target that has been led through the flow path, and a device to introduce to the contact section a liquid that contains products produced from the decomposition of the decomposition target by the decomposing device, wherein the decomposing device may have electrodes that come into contact with and electrolyze the decomposition target that flows through the flow path, and wherein the surfaces of the electrodes are positioned within the decomposing device at an angle different from the direction the liquid flows in the flow path. The electrodes may be plate-shaped in a preferred embodiment.

The different angle may be an angle perpendicular to the direction the liquid flows.

The decomposition apparatus may also have a device to have a separately prepared medium, in a state cut off from the outside air, take in the products produced from the decomposition of the decomposition target by the decomposing device.

The medium may be a liquid.

The medium may be an adsorbent.

The decomposition target may be an organic chlorinated compound.

The organic chlorinated compound may be at least one of monochloroacetic acid, dichloroacetic acid and trichloroacetic acid.

The product may be chlorine.

A decomposition method in accordance with an embodiment of the present invention includes a step to bring a gaseous decomposition target and a liquid come into contact with each other and have the decomposition target be taken into the liquid, and a step to move the liquid containing the decomposition target in a predetermined direction and electrolyze the liquid as the liquid comes into contact with the surfaces of the electrodes, where the surfaces of the electrodes are positioned at an angle different from the predetermined direction.

In accordance with another embodiment of the present invention, a decomposition apparatus includes a storage tank to store the decomposition target, a decomposition target supply device to supply the decomposition target to the storage tank, a pipe system to pump the decomposition target out of the storage tank to recirculate it into the storage tank, a decomposing device to decompose the decomposition target, and a collection section to carry and collect the decomposition products that are produced by decomposing the decomposition target.

The decomposing device may be provided inside the storage tank.

The decomposing device may be provided at some point along the pipe system.

The decomposing device may be in a decomposition tank that is provided at some point along the pipe system.

The storage tank may be equipped on its inside with a gas-liquid contact section, wherein the liquid that contains the decomposition target that is moved out from the storage tank and recirculated into the storage tank and a gas that contains the decomposition target supplied from the decomposition target supply device are brought into a gas-liquid contact.

The pipe system may be filled with the liquid during decomposition of the decomposition target.

The decomposing device may be positive and negative electrodes to perform electrolysis.

The positive and negative electrodes may be in the form of lines or plate-shaped and positioned to be substantially perpendicular to the flow of the fluid. This means that the common line perpendicular to each of the electrode lines or the electrode surfaces is parallel to the flow of the liquid. Here, "perpendicular" and "parallel" may not have to be "completely perpendicular" and "completely parallel," respectively.

In another embodiment, the positive and negative electrodes may be in the form of lines or plate-shaped and positioned generally with the flow of the fluid. This means that the common line perpendicular to each of the electrode lines or the electrode surfaces is perpendicular to the flow of the liquid. Here also, "perpendicular" may not have to be "completely perpendicular."

The decomposition target may be an organic chlorinated compound.

A decomposition method in accordance with another embodiment of the present invention pertains to a decomposition method that uses one of the decomposition apparatuses described above, and includes a step to supply the decomposition target to the storage tank, a stop to move the decomposition target out of the storage tank to recirculate it into the storage tank, a step to decompose the decomposition target, and a step to carry and collect the decomposition products that are produced by decomposing the decomposition target.

The decomposition target may be decomposed in the storage tank.

The decomposition target may be decomposed after it is carried out of the storage tank and before it is recirculated into the storage tank.

Other features and advantages of the invention will be apparent from the following detailed description, taken in conjunction with the accompanying drawings that illustrate, by way of example, various features of embodiments of the invention.

DETAILED DESCRIPTION OF PREFERRED EMBODIMENTS

Figure 1:
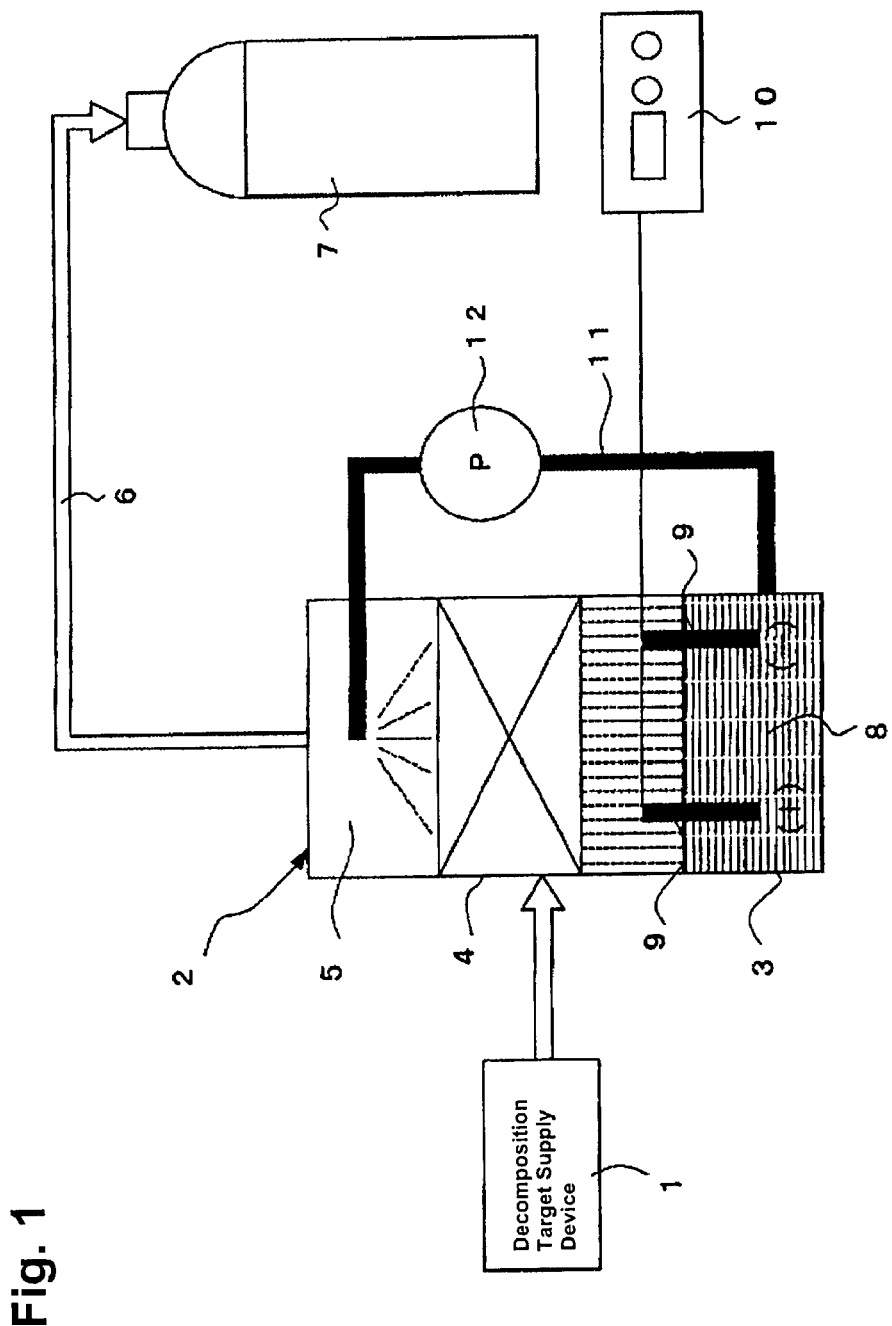
FIG. 1 is a diagram illustrating a decomposition apparatus in accordance with a first embodiment of the present invention.

Next, preferred embodiments of the present invention will be described with reference to the accompanying drawings. FIG. 1 schematically shows a decomposition/removal apparatus and decomposition/removal method according to a first embodiment of the present invention for organic chlorinated compounds (substances) that are hazardous materials.

In FIG. 1, an organic chlorinated compound in a gaseous or mist state is introduced into a gas-liquid contact-type gas absorption tower 2 by a decomposition target supply device 1 at a predetermined flow speed. The absorption tower 2, for example, is a closed-type hollow shell structure as shown, and has an absorber storage tank 3 that stores an absorber at the bottom; a built-in gas-liquid contact section 4 in the center section comprising a packing material with high porosity and low resistance to gas flow; and above the gas-liquid contact section 4 a spray chamber 5 to spray the absorber. The top of the spray chamber 5 is connected to an absorption tower 7, which is a secondary processing unit, via an exhaust pipe 6. In the present embodiment, the absorber is in a liquid form.

The organic chlorinated compound in a gaseous or mist state may be, for example, dichloromethane; carbon tetrachloride; 1,2-dichloroethane; 1,1-dichloroethylene; cis-1,2-dichloroethylene; 1,1,1-trichloroethane; 1,1,2-trichloroethane; trichloroethylene; tetrachloroethylene; 1,3-dichloropropene; dioxin(tetrachlorodibenzo-?-dioxin); and other hazardous materials, and these are often found in contaminated soils in vacant lots where factories used to stand, for example.

Organic chlorinated compounds that are to be removed or decomposed include, in addition to the hazardous materials listed above, decomposition products of the above hazardous materials. For example, haloacetic acids such as trichloroacetic acid, dichloroacetic acid and monochloroacetic acid that are known to be produced when chloroethylene substances are photolyzed can be removed and/or decomposed using the present invention.

Dichloroacetic acid is produced when trichloroethylene-contaminated gas is photolyzed. Dichloroacetic acid is liquid at room temperature, but in systems in which photolysis takes place while the trichloroethylene-contaminated gas is continuously supplied, a decomposition product, dichloroacetic acid, is present in a mist state in the process gas flow.

The hazardous materials that are targets of decomposition and that are supplied from the decomposition target supply device include hazardous materials extracted from contaminated soil, contaminated groundwater, hazardous materials obtained by aerating contaminated water, hazardous materials adsorbed on activated carbon and released by heat, and hazardous materials in exhaust gas from factories and chemical processes.

An absorber 8, which is water or an electrolytic aqueous solution such as sodium chloride dissolved in water, is stored in the storage tank 3. Within the storage tank 3 is provided a pair of positive/negative electrodes 9, whose bottom parts are immersed in the absorber 8 and whose two electrodes are positioned opposite each other. When a current that is DC converted by a rectifier 10 is applied to each of the electrodes 9, the absorber 8 is electrolyzed, and chlorine gas and other byproduct gases isolated by this oxidation-reduction reaction move through the gas-liquid contact section 4, the spray chamber 5 and the exhaust pipe 6 to the absorption tower 7, where a secondary processing, such as absorption of chlorine gas, takes place continuously. The positive/negative electrode 9 and the rectifier 10 comprise an electrolysis device.

An amperage required for electrolysis is adjusted by the rectifier 10 depending on the flow speed of a gas that contains the organic chlorinated compound and that is supplied from the decomposition target supply device 1 and on the concentration of the organic chlorinated compound. Possible ways to measure the concentration of the organic chlorinated compound are estimating the concentration based on the concentration measured when a contaminant is absorbed from the soil, and providing a sensor within the absorption tower 2.

The absorber 8 in the storage tank 3 is carried upward through a circulation pipe 11 (a connection pipe) by a circulation pump 12 that is disposed in the circulation pipe 11, and is sprayed by a delivery device 13 onto the top of the gas-liquid contact section 4. As the absorber 8 flows downward inside the gas-liquid contact section 4, it captures the organic chlorinated compound from a gas that flows into the gas-liquid contact section 4 from the decomposition target supply device 1 (the organic chlorinated compound is charged into the absorber 8) and flows down into the storage tank 3. The cycle of its circulation into the gas-liquid contact section 4 from above via the circulation pipe 11 repeats.

It is desirable for the gas-liquid contact section 4 to maintain a long contact time between the gas and the liquid. To this end, packing material with a labyrinth structure (trade name: Tri-Packs by Tomoe Engineering Co., Ltd.), for example, can be used. While the organic chlorinated compound contained in the gas is introduced into an area adjacent to the bottom of the gas-liquid contact section 4 and pushed upward to the exhaust pipe 6 by the gas that flows in from the decomposition target supply device 1, the absorber 8 that is sprayed onto the top of the gas-liquid contact section 4 drips on the gas containing the organic chlorinated compound and disperses it, thereby causing the absorber 8 and the gas containing the organic chlorinated compound to have a gas-liquid contact. Since the organic chlorinated compound in the gas introduced has properties that make it prone to being taken into a solution, it becomes dissolved in the absorber 8 as the absorber 8 that has absorbed the organic chlorinated compound flows downward into the storage tank 3. The reasons for having the organic chlorinated compound come into contact with the absorber 8 in the gas-liquid contact section 4 are that the gas that contains the organic chlorinated compound can be introduced with a small amount of energy and that the gas-liquid contact time can be maintained for a long time.

Gases that are generated as a result of decomposition through electrolysis are hydrogen, oxygen, chlorine, carbon dioxide and methane. Since these gases are continuously discharged to the absorption tower 7 via the exhaust pipe 6, there is no accumulation of gases in the absorption tower 2. Gases produced are difficult to be taken into water, and therefore it is considered that they are unlikely to be reabsorbed by the absorber 8 in the gas-liquid contact section 4. Further, the absorber 8 is sprayed in the spray section 5 onto the top of the gas-liquid contact section 4, and this releases heat that has been generated. Moreover, due to the fact that the absorber 8 in the circulation pipe 11 is forcefully circulated by the circulation pump 12, there is no accumulation of gases within the circulation pipe 11 either. In the meantime, the absorption tower 2 maintains a medium that takes in the gases. The medium is a liquid or an absorbent, for example.

According to the present embodiment, since all of the solution that absorbs the organic chlorinated compound during or after electrolysis is circulated and not discharged outside of the system including the gas-liquid contact-type gas absorption tower 2, there is practically no need to process the solution.

In other words, in accordance with the present embodiment, since the decomposition takes place within a system cut off from the outside air, hazardous materials produced in the decomposing process are not released outside the system and the system is therefore safe. The allowable chlorine concentration in air is 0.5 ppm in terms of environmental management in work areas according to the Occupational Safety and Health Act.

Furthermore, the absorber 8 in the storage tank 3, where the electrolysis of the gas containing the organic chlorinated compound that is introduced into the gas-liquid contact-type gas absorption tower 2 at a predetermined flow speed takes place, is circulated by the circulation pump 12. Consequently, the absorption and electrolysis of the organic chlorinated compound take place continuously and simultaneously. In other words, if an input amperage is set based on the flow volume of the gas containing the organic chlorinated compound that is introduced into the gas absorption tower 2 and on the concentration of the organic chlorinated compound in the gas, the concentration of the organic chlorinated compound within the absorber 8 can be maintained at a high level, i.e., its high concentration level can be maintained. As a result of this, the electrolysis efficiency per unit amperage supplied from the rectifier 10 can be maintained at a high level at all times.

The relationship among the flow volume of the gas containing the organic chlorinated compound that is introduced into the gas absorption tower 2, the concentration of the organic chlorinated compound in the gas, and the input amperage can be established as follows. For example, the flow volume of the gas containing the organic chlorinated compound that is introduced into the gas absorption tower 2 and the concentration of the organic chlorinated compound in the gas are measured with a sensor, and an experimental data table showing the relationship between these and the input amperage is created. Input amperage can be set based on the data thus obtained.

Figure 2:
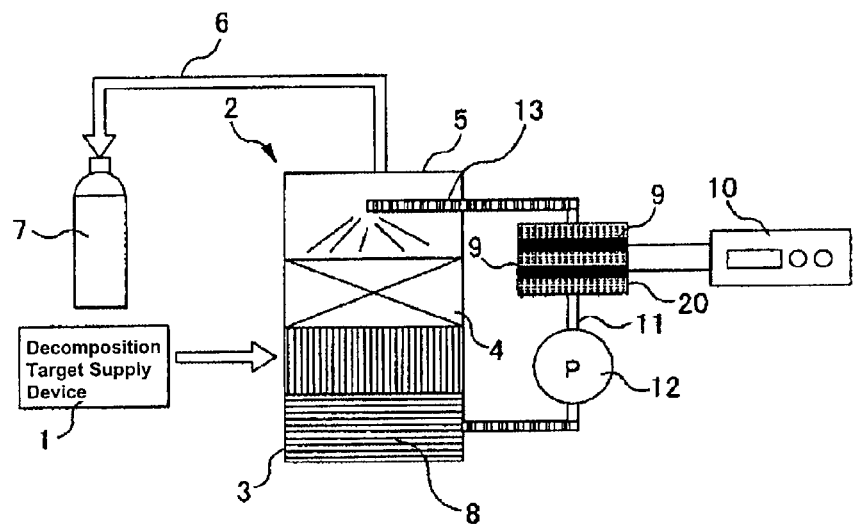
FIG. 2 is a diagram illustrating a decomposition apparatus in accordance with a second embodiment of the present invention.

FIG. 2 is a decomposition/removal device in accordance with a second embodiment of the present invention, which differs from the first embodiment in that positive/negative electrodes 9 are not provided in a storage tank 3' of a gas-liquid contact-type gas absorption tower 2, that an electrolysis tank 20 is provided along the path of a circulation pipe 11, and that a pair of positive/negative electrodes 9 is provided inside the electrolysis tank 20. Here, the positive/negative electrodes 9 are plate-shaped and the common perpendicular line of the electrode surfaces, which are positioned opposite each other, is positioned parallel to the direction of the flow of the liquid that flows within the circulation pipe 11, i.e., the electrode surfaces are perpendicular to the flow of the liquid. There are holes in the electrode surfaces so as not impede the flow of the liquid. Otherwise, the structure of the second embodiment is the same as that of the first embodiment and effects similar to those of the first embodiment can be obtained from the second embodiment as well.

In circulation-type devices, the decomposition target does not have to be completely decomposed, which increases the liquid delivery speed. In the second embodiment in particular, the flow speed allows the surfaces of the electrodes to be washed and removes bubbles from the electrode surfaces while at the same time reducing the heat on the electrodes that was generated from electrolysis. In contrast, in devices in which the absorber 8 is not circulated, the decomposition target must be virtually completely decomposed in electrolysis, which requires a significant amount of energy and slows down the liquid delivery speed.

In the present embodiment, the electrolysis tank 20 and the storage tank 3 are separately provided. Components such as the positive/negative electrodes 9 for electrolysis that require maintenance are provided in the electrolysis tank 20, which has a simpler structure. Consequently, maintenance on the electrodes 9 can be easily done by detaching only the electrolysis tank 20 from the circulation pipe 11.

Figure 3:
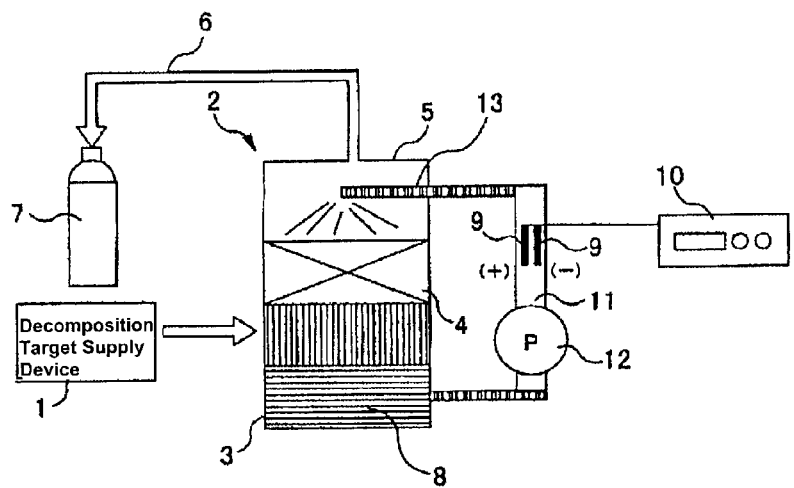
FIG. 3 is a diagram illustrating a decomposition apparatus in accordance with a third embodiment of the present invention.

FIG. 3 indicates a decomposition/removal device in accordance with a third embodiment of the present invention, and it differs from the aforementioned embodiments in that a pair of positive/negative electrodes 9 is provided in a circulation pipe 11 instead of in the electrolysis tank 20. The electrode plates of the positive/negative electrodes 9 are positioned so that the common perpendicular line of the plate surfaces is perpendicular to the direction of the flow of the absorber 8, in other words, the electrode surfaces are positioned parallel to the direction of the flow of the absorber 8. Otherwise, the structure of the present embodiment is the same as the structure of the first embodiment, and effects similar to those of the second embodiment can be obtained from this embodiment as well.

Figure 5:
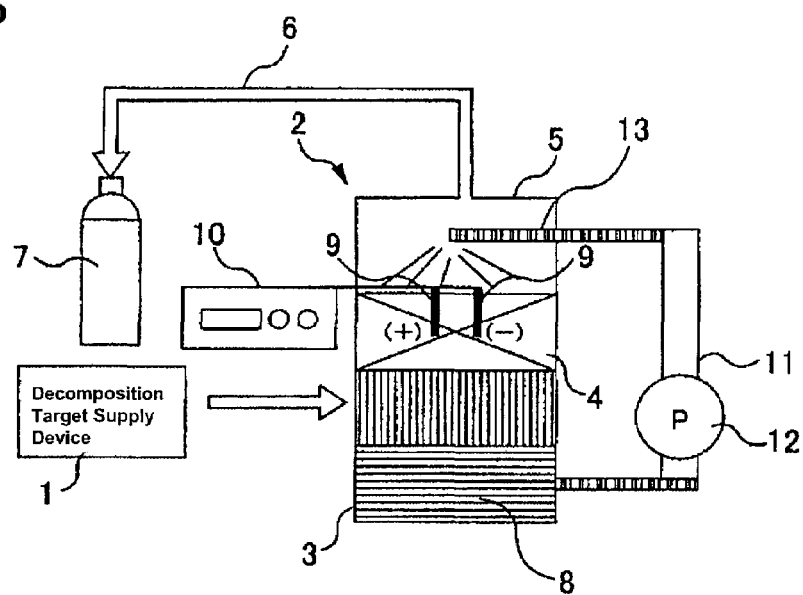
FIG. 5 is a diagram illustrating a decomposition apparatus in accordance with a fourth embodiment of the present invention.

Many modifications can be made without departing from the present invention. For example, electrodes may be further provided in the storage tank 3 as in the first embodiment. In addition to or instead of providing the electrodes in the storage tank, a pair of positive/negative electrodes 9 can be provided in the gas-liquid contact section 4 in accordance with a fourth embodiment of the present invention, as shown in FIG. 5. Further, in addition to the electrolysis tank 20 provided in the second embodiment, a pair of positive/negative electrodes 9 can be provided in the circulation pipe. In either the first or second embodiment, one of the positive and negative electrodes 9 can be connected to the shell of the gas-liquid contact-type gas absorption tower 2 or the circulation pipe 11. Or, the structures of the first and second embodiments can be combined, or a structure may combine various modifications described in this paragraph. Moreover, in any of the embodiments, the positive negative electrode plates can be placed parallel or perpendicular to the flow of the absorber 8. In addition, the positive and negative electrodes 9 may be constructed with electrode wires, or negative electrode plates may be lined on the inner wall of the circulation pipe, while a cylindrical positive electrode pole is provided in the center of the pipe 11 coaxially.

In any of the embodiments, a part or all of the gas that was produced from the electrolysis by the electrodes 9 is delivered from the absorber in the circulation pipe 11 to the spray chamber 5 (space inside the spray chamber 5) by a delivery device 13. When this happens, most of the gas generated from the decomposition (vaporized decomposition product) is discharged through the exhaust pipe 6. Undecomposed decomposition target in the absorber remains in the liquid and is electrolyzed again. In other words, substances requiring decomposition are decomposed in the liquid, so that a liquid containing vaporized decomposed product is obtained, while at the same time the liquid containing the vaporized decomposition product is delivered into the space, thereby separating the vaporized decomposition product from the liquid.

In the embodiments described above, the gas-liquid contact-type gas absorption tower 2 was used. However, in another embodiment, the gas-liquid contact section 4 may be omitted, or in addition to the gas-liquid contact section 4, an introduction pipe for gas containing organic chlorinated compound can be directly inserted into the absorber 8 stored in the storage tank 3, so that the organic chlorinated compound can be directly absorbed by the absorber 8.

Organic chlorinated compounds are listed as hazardous materials in the present specification, but substances that can be decomposed under this invention are not limited to these and include all substances involved in oxidation-reduction reaction in addition to those listed.

EXAMPLE

When the organic chlorinated compound in a gaseous or mist state that is the subject of measurement is dichloroacetic acid (DCA), the following concentration projection was made concerning the relationship among the measurement conditions, absorption rate of the organic chlorinated compound and the amount of decomposition, based on the following theoretical formulas.

<1. Conditions>

DCA production rate D: μg/sec (constant)
Energization time T: sec
DCA absorber amount V: L
Initial DCA concentration $C(0)$: μg/L
Concentration $C(T)$ of DCA in solution after T sec: μg/L
DCA decomposition amount R per unit electrical charge: μg/c <2. Without Energization>

When DCA is absorbed without any energization, the concentration of the DCA in the solution after T sec is expressed by the following formula:

$$C(T) = (DT/V) + C(0) \tag{1}$$

<3. With Energization>

The following relational formula for the decomposition amount R μg/c per unit electrical charge was established from an experiment (3.5 L desiccator, Cl concentration 0.1%):

$$R = 0.032 \times \{C(T) \times 10^{-3}\} 0.88 \tag{2}$$

the approximation of which is:

$$R = 6.14 \times 10^{-3} (C(T) \times 10^{-3}) \tag{3}$$

Since $R \times dE = R \times I$ (constant current)$\times dT$, the decomposition amount in dT sec is expressed by the following formula:

$$\text{Decomposition amount} = 6.14 \times 10^{-6} \times C(T) \times I \times dT \tag{4}$$

Since the DCA production amount in dT sec is $D \times dT$, the concentration change dC in dT can be expressed by the following formula:

$$dC = (DdT/V) - (6.14 \times 10^{-6} \times C(T) \times dT)/V$$

$$dC/dT = D/V - (6.14 \times 10^{-6} \times C(T) \times I)/V \tag{5}$$

Here, when $D/V = a$, and $(6.14 \times 10^{-6} \times I)/V = b$, $$dC/dT = a - bC(T) = b((a/b) - C(T))$$

$$= -b(C(T) - (a/b))$$

$$d(C(T) - (a/b))/dT = dC(T)/dT - (d(a/b))$$

$$/dT = -b(C(T) - (a/b))$$

$$d(C(T) - (a/b))/((C(T) - (a/b)) = -bdT$$

When both sides are integrated with T:

$$\log(C(T) - (a/b)) = -bT + K; \text{ where } K \text{ is a constant.}$$

$$C(T) - (a/b) = e^{-bT+K} = K1 e^{-bT}; \text{ where } K1 \text{ is a constant.}$$

Therefore:

$$C(T) = (a/b) + K1 e^{-bT}$$

Here, since the initial concentration (T=0) is $C(0)$, $$K1 = C(0) - (a/b)$$

$$C(T) = (a/b) + (C(0) - (a/b))e^{-bT} \tag{6}$$

When $T \to \infty$, $C(\infty) = (a/b) = D/(6.14 \times 10^{-6} \times I)$.

Next, an electrolysis experiment was conducted based on the above theory and the following results were obtained:

1. Experiment Condition

Decomposition target: DCA in a gaseous or mist state in air

Absorption rate: approximately 15 μg/sec (with some fluctuations)

Absorber amount: 3L

Concentration of chlorine in absorber: 0.1%

Initial concentration: initial DCA concentration in absorber (concentration approximately 1000 mg/L before energization)

Energization conditions: direct current 2A, voltage 20V

Electrode shape: platinum electrodes, plate-shaped (50 cm$^2$), distance between electrodes 3 cm Device structure: a structure with electrodes inserted into an absorption tower (see FIG. 1)

2. Experiment Results

Figure 4:
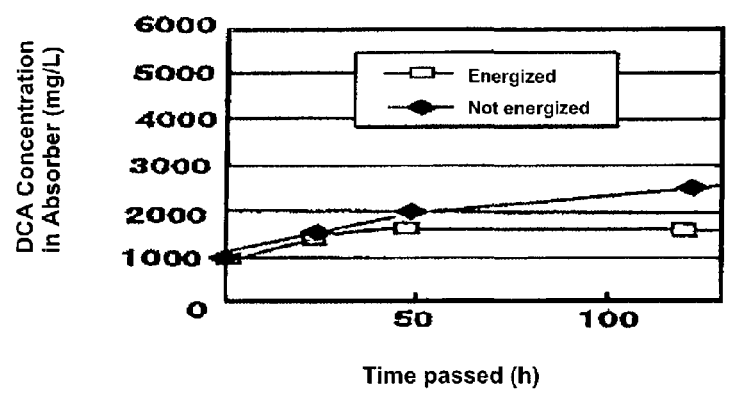
FIG. 4 is a graph comparing two situations, one with absorption only and the other with absorption and electrolysis combined.

The results are shown in FIG. 4. From this graph, it can be observed that although the concentration of DCA in the absorber increases and accumulates when there is no energization, once a current is applied across the electrodes, the concentration of DCA remains constant at all times. No DCA was found in the exhaust gas from the equivalent of the exhaust pipe 6 in FIG. 1.

As is clear from the above description, a solution that has taken in an organic chlorinated compound, which is the decomposition target, can be continuously processed while maintaining high decomposition efficiency, according to the decomposition apparatuses and the decomposition method for decomposition target in the present invention.

While, the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A decomposition apparatus comprising:
   a supply device for supplying a gaseous decomposition target into the decomposition apparatus;
   a contact section having an internal space to allow the decomposition target to come into contact with and be taken into a liquid;
   a flow path to conduct along with the liquid the decomposition target taken into the liquid to a position different from the internal space;
   a decomposition device positioned in the flow path in a state cut off from the outside air to decompose the decomposition target that has been conducted through the flow path;
   a device to introduce to the contact section the liquid that contains products produced from the decomposition of the decomposition target by the decomposition device;
   a circulating pump for circulating the liquid in a path formed by at least the contact section and the flow path; and
   a sensor for measuring a concentration of the decomposition target not decomposed in the liquid and the decomposition target supplied from the supply device,
   wherein the decomposition device includes electrodes that come into contact with and electrolyze the decomposition target that flows through the flow path, and a rectifier for adjusting an amount of electric current flowing into the electrodes based on a measurement taken by the sensor, and
   wherein surfaces of the electrodes are positioned within the decomposition device at an angle different from a flow direction of the liquid in the flow path.

2. A decomposition apparatus according to claim 1, wherein the electrodes are plate-shaped electrodes.

3. A decomposition apparatus according to claim 1, wherein the different angle is an angle perpendicular to the flow direction the liquid.

4. A decomposition apparatus according to claim 1, forth comprising a device to have a separately prepared medium take in the products produced from the decomposition of the decomposition target by the decomposition device in a state cut off from the outside air.

5. A decomposition apparatus according to claim 4, wherein the medium is a liquid.

6. A decomposition apparatus according to claim 4, wherein the medium is an adsorbent.

* * * * *

UNITED STATES PATENT AND TRADEMARK OFFICE
CERTIFICATE OF CORRECTION

PATENT NO. : 7,083,707 B2  
APPLICATION NO. : 10/206622  
DATED : August 1, 2006  
INVENTOR(S) : Toshihiko Miura et al.

Page 1 of 1

It is certified that error appears in the above-identified patent and that said Letters Patent is hereby corrected as shown below:

<u>COLUMN 2</u>

Line 25, "come" should be deleted.

<u>COLUMN 4</u>

Line 49, "electrode 9" should read --electrodes 9--.

<u>COLUMN 10</u>

Line 37, "direction" should read --direction of--; and  
    Line 38, "forth" should read --further--.

Signed and Sealed this

Sixth Day of February, 2007

JON W. DUDAS  
*Director of the United States Patent and Trademark Office*